(12) United States Patent
Andrus, Jr. et al.

(10) Patent No.: US 7,896,951 B2
(45) Date of Patent: Mar. 1, 2011

(54) REDUCING CARBON DIOXIDE ($CO_2$) EMISSIONS FROM THE BURNING OF A FOSSIL FUEL

(75) Inventors: Herbert E. Andrus, Jr., Granby, CT (US); Glen D. Jukkola, Glastonbury, CT (US); Michael S. McCartney, Vero Beach, FL (US)

(73) Assignee: ALSTOM Technology Ltd, Baden (CH)

( * ) Notice: Subject to any disclaimer, the term of this patent is extended or adjusted under 35 U.S.C. 154(b) by 238 days.

(21) Appl. No.: 12/371,721

(22) Filed: Feb. 16, 2009

(65) Prior Publication Data

US 2009/0205492 A1    Aug. 20, 2009

Related U.S. Application Data

(60) Provisional application No. 61/029,395, filed on Feb. 18, 2008.

(51) Int. Cl.
*F23J 15/02* (2006.01)
*B01D 53/12* (2006.01)

(52) U.S. Cl. ............................ 95/107; 95/139; 423/230; 422/144; 422/145; 422/146; 422/147; 165/104.16

(58) Field of Classification Search ........... 95/107–112, 95/114, 115, 139, 148; 96/134, 150; 423/230; 422/139, 144–147, 168; 165/104.16; 55/459.1
See application file for complete search history.

(56) References Cited

U.S. PATENT DOCUMENTS 2,549,104 A  *  4/1951  Lechthaler ................... 95/110
4,319,893 A  *  3/1982  Hatch et al. ................... 95/27
5,665,319 A  *  9/1997  Hirama et al. .............. 422/177
6,554,061 B2    4/2003  Jukkola et al.
2004/0228788 A1   11/2004  Nagai et al.

OTHER PUBLICATIONS

PCT International Search Report and The Written Opinion of the International Searching Authority dated Aug. 10, 2009—(PCT/US2009/034265).

* cited by examiner

*Primary Examiner*—Frank M Lawrence
(74) *Attorney, Agent, or Firm*—Robert D. Crawford

(57) ABSTRACT

A system for reducing carbon dioxide emissions from gasses generated in burning fossil fuel, includes a vessel, separator and reheater. The upper portion of the vessel receives downward flowing, first type solid particles capable of absorbing heat from upward flowing gasses and second type solid particles capable of capturing carbon dioxide from the gasses. The separator separates the second type solid particles with the captured carbon dioxide from the gasses discharged from the first vessel discharge, and directs the separated second type solid particles with the captured carbon dioxide to a separator discharge. The reheater directs the first type solid particles and the second type solid particles with the captured carbon dioxide in a downwardly flow to a first reheater discharge, such that heat from the first type solid particles causes the captured carbon dioxide to be released from the second type solid particles.

18 Claims, 5 Drawing Sheets

REDUCING CARBON DIOXIDE (CO$_2$) EMISSIONS FROM THE BURNING OF A FOSSIL FUEL

RELATED APPLICATIONS

The present application is related to U.S. application Ser. No. 09/740,356, filed Dec. 18, 2000 and entitled "Recuperative and Conductive Heat Transfer System", now U.S. Pat. No. 6,554,061, issued on Apr. 29, 2003, the disclosure of which is incorporated herein in its entirety by reference.

FIELD OF THE INVENTION

The present invention relates to heat transfer systems, and more particularly to a technique for reducing carbon dioxide (CO$_2$) emissions from the burning of a fossil fuel.

BACKGROUND OF THE INVENTION

Furnaces for firing fossil fuels have long been employed to generate controlled heat, with the objective of doing useful work. The work might be in the form of direct work, as with kilns, or might be in the form of indirect work, as with steam generators for industrial or marine applications or for driving turbines that produce electric power.

Modern water-tube furnaces can generate large quantities of steam at higher pressures. Such modern water-tube furnaces for steam generation include central-station steam generators, industrial boilers, fluidized-bed boilers, and marine boilers. While, strictly speaking, the recuperative and conductive heat transfer system to which the present application is directed does not fall within any of these furnace type classifications, it might be considered to be more akin to a fluidized-bed boiler than to any of the other various types of modern water-tube furnaces referred to above. As such, the following discussion will include background relating to fluidized-bed boilers.

Fluidized-bed boilers have been used for decades to burn solid fuels with very high efficiency at a temperature low enough to avoid many of the problems of other solid fuel combustion techniques. As is well known to those of ordinary skill in the art, the word "fluidized" as employed in the term "fluidized-bed boiler" refers to the condition in which solid materials are given free-flowing fluid-like behavior. More particularly, as a gas is passed through a bed of solid particles, the flow of gas produces forces that tend to separate the particles from one another.

At low gas flows, the particles remain in contact with other solids and tend to resist movement. This condition is commonly referred to as a fixed bed. On the other hand, as the gas flow is increased, a point is reached at which the forces on the particles are just sufficient to cause separation. The bed then becomes fluidized, that is, the gas cushion between the solids allows the particles to move freely, giving the bed a liquid-like characteristic. The state of fluidization in a fluid-bed-boiler combustor depends mainly on the bed-particle diameter and fluidizing velocity.

There are essentially two basic fluid-bed combustion systems, each operating in a different state of fluidization. One of these two basic fluid-bed combustion systems is characterized by the fact that at relatively low velocities and with coarse bed-particle sizes, the fluid bed is dense, with a uniform solids concentration, and has a well-defined surface. This system is most commonly referred to by those in the industry as a bubbling fluid bed, because the air in excess of that required to fluidize the bed passes through the bed in the form of bubbles. The bubbling fluid bed is further characterized by modest bed solids mixing rates, and relatively low solids entrainment in the flue gas. While little recycle of the entrained material to the bed is needed to maintain bed inventory, substantial recycle rates may be used to enhance performance.

The other of these two basic fluid-bed combustion systems is characterized by the fact that at higher velocities and with finer bed-particle size, the fluid bed surface becomes diffuse as solids entrainment increases, such that there is no longer a defined bed surface. Moreover, recycling of entrained material to the bed at high rates is required in order to maintain bed inventory. The bulk density of the bed decreases with increasing height in the combustor. A fluidized-bed with these characteristics is most commonly referred to those by those in the industry as a circulating fluid bed because of the high rate of material circulating from the combustor to the particle recycle system and back to the combustor. The circulating fluid bed is further characterized by very high solids-mixing rates.

Regardless of whether a bubbling type mode of operation is employed or whether a circulating fluidized bed type mode of operation is employed, there is a requirement that fluidizing air must be injected at a preselected velocity determined principally on whether the particular fluidized-bed is intended to operate in a bubbling bed type mode or in a circulating fluidized bed type mode.

Commonly, in large circulating fluidized bed boilers, the residual ash/sorbent particles and the flue gas, which are the byproduct of combustion of the circulating or bubbling fine solid fuel particles, are separated from each other, and the residual ash/sorbent particles are caused to flow to and through a fluid bed heat exchanger. No attempt is made to classify the type of or separate the residual ash/sorbent particles that are caused to flow back to and through the fluid bed heat exchanger. Rather, a mixture of all of the residual ash/sorbent particles that have been produced are caused to flow to and through the fluid bed heat exchanger.

In those implementations in which fluid bed ash coolers are employed to cool the residual ash/sorbent particles as these particles leave a large circulating fluidized bed unit, the fluid bed ash cooler may operate to separate large ash particles from the fines entrained therewith, before the separated fines are returned to the large circulating fluidized bed unit. However, the particles that are separated by the operation of such fluid bed ash coolers will include a mixture of all of the residual ash/sorbent particles that have been produced as a consequence of the combustion of the solid fuel in the presence of air. Furthermore, although there may be some separation of particles, here again no attempt is made to classify the types of particles that are included in the ash.

While it has been proposed to separate fluid bed particles including bauxite from a bubbling bed, this proposal did not suggest separating ash/sorbent particles from the fluid bed particles including bauxite before the later particles are caused to flow to the heat exchanger.

In summary, historically it has been the common practice in fluidized bed boilers, and in particular in large circulating fluidized bed boilers, not to classify/separate the various types of residual solid particles, before they are made to return to a fluid bed heat exchanger. In this regard, no attempt was made to effect a classification/separation between the types of solid particles, which collectively make up the residual ash/sorbent particles produced as a consequence of the combustion of the solid fuel in the presence of air in the combustor of fluidized bed units, either before or after such particles are caused to flow through a heat transfer system. Because of this, it was not historically possible to effect a complete decoupling of the combustion, heat transfer and environmental control processes in fluidized-bed boilers, and hence to separately control and/or optimize each of these processes.

However, recently a new and improved heat transfer system was developed that facilitates a complete decoupling of the combustion, heat transfer and environmental control processes in what is somewhat akin to a fluidized-bed type operation. This system is described in detail in U.S. Pat. No. 6,554,061, which shares inventors with those named in the present application and is assigned to the assignee of the present application.

As described in the '061 patent, the disclosed recuperative and conductive heat transfer system completely decouples the combustion, heat transfer and environmental control processes, thus allowing each of these processes to be separately optimized. In part, the patent discloses how (i) a moving bed of bauxite Al2O3 particles can be directed in a flow counter to the flow of the hot gases and any residual ash/sorbent particles from an internal or external heat source in one chamber, e.g. a combustion chamber, of the system to recoup heat, (ii) the heated bauxite Al2O3 particles can be separated from the hot gases and any residual ash/sorbent particles, (iii) the separated bauxite Al2O3 particles can transfer the recouped heat to a working fluid in another chamber, e.g. a plenum heat exchanger, and (iv) the separated residual ash/sorbent particles can transfer residual heat to preheat combustion air in another chamber, e.g. an air heater, and be subject to further combustion in the one chamber, e.g. a combustion chamber, of the system. While, as described in U.S. Pat. No. 6,554,061, the recuperative and conductive heat transfer system can be operated to maintain relatively low level emissions of the residual ash/sorbent particles, the patent does not address carbon dioxide, e.g., $CO_2$, emissions.

In view of the ongoing debate over global warming has continued, the increasing attention being given to carbon dioxide ($CO_2$) emissions from the burning of fossil fuels, and the expense and inefficiency of conventional techniques for capturing carbon dioxide emissions, a need exists for a recuperative and conductive heat transfer technique which reduces carbon dioxide emissions resulting from the burning of fossil fuels.

OBJECTS OF THE INVENTION

Accordingly, it is a primary object of the present invention to provide an improved technique for removing carbon dioxide from gases and/or residual ash/sorbent particles produced as a consequence of combustion of fossil fuel in the presence of air in a combustor.

It is another object of the present invention to provide a recuperative and conductive heat transfer system capable of reducing carbon dioxide emissions from the burning of fossil fuel.

Additional objects, advantages, novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY OF THE INVENTION

In accordance with the invention, a system for reducing carbon dioxide emissions from gasses generated in burning fossil fuel, includes a vessel, separator and reheater. The burning may be performed within the system or external to the system. The vessel is configured, e.g. is sized and shaped, to direct gasses generated in burning fossil fuel in a upwardly flow from a lower portion of the vessel to an upper portion of the vessel. The vessel is also configured, e.g. with an opening, to receive, into the upper portion of the vessel, first type solid particles capable of absorbing heat from the gasses and second type solid particles capable of capturing carbon dioxide from the gasses. Preferably, the first type solid particles include bauxite and the second type solid particles include limestone, most preferably quicklime, and could for example be CaO particles. After capturing the carbon dioxide, the carbonated limestone could be in the form of $CaCO_3$ particles.

The vessel directs the received first type solid particles in a downwardly flow from the upper portion of the vessel to the lower portion of the vessel. Preferably, the downwardly flow of the received first type solid particles is a gravity based flow. That is, preferably there is no system energy used to force the downward flow of the first type solid particles. The velocity of the upwardly flow of gasses is sufficient to cause the second type solid particles to flow with the upwardly flowing gasses to a first vessel discharge, but is insufficient to impede the downwardly flow of the first type solid particles to a second vessel discharge.

The separator, which could for example be a cyclone separator, is configured to separate the second type solid particles with captured carbon dioxide from the gasses discharged from the first vessel discharge. The separator also directs the separated second type solid particles with the captured carbon dioxide to a separator discharge.

The reheater, is configured to direct the first type solid particles with the absorbed heat discharged from the second vessel discharge and the second type solid particles with the captured carbon dioxide discharged from the separator discharge in a downwardly flow to a first reheater discharge. The reheater is preferably a carbonate reheater. Such reheaters are sometimes also referred to as calciners. The flow is directed by the reheater such that heat from the first type solid particles causes the captured carbon dioxide to be released from the second type solid particles. The reheater directs the released carbon dioxide to a second reheater discharge from which it can be further directed for storage or used as desired.

Beneficially, the flow of gasses within the vessel heats the upper portion of the vessel to a temperature within a range of 1000 to 1400 degrees Fahrenheit, and the second type solid particles capture the carbon dioxide from the gasses at these temperatures. Of course, if the temperature is in flux, the second type solid particles might also capture the carbon dioxide from the gasses at other temperatures within the range. Beneficially the flow of the first type solid particles with the absorbed heat heats the reheater to a temperature within a range of 1800 to 2000 degrees Fahrenheit, and the captured carbon dioxide is released from the second type solid particles at this temperature. Here again, if the temperature is in flux, the captured carbon dioxide may be released from the second type solid particles at other temperatures within this later range. The system can be operated such that the released carbon dioxide is substantially, i.e. over 90%, pure carbon dioxide.

According to other aspects of the invention, the second vessel discharge includes an interconnection device having an upper opening, a lower opening, and a passageway. The upper opening is configured to receive the downwardly flowing first type solid particles with the absorbed heat from the lower portion of the vessel. The lower opening is configured to discharge the downwardly flowing first type solid particles with the absorbed heat into the reheater. The passageway has an aperture and is configured to receive a flow of air, having a velocity, through the aperture and to direct the received flow of air through the passageway. The passageway also directs the heated first type solid particles with the absorbed heat in a downwardly flow from the upper opening to the lower opening. The velocity of the received flow of air directed to the passageway is insufficient to impede the downwardly flow of the first type solid particles with the absorbed heat from traversing the passageway from the upper opening to the lower opening, but is sufficient to impede the upwardly flow of the released carbon dioxide from traversing the passageway from the lower opening to the upper opening and thereby entering the vessel.

Advantageously, the system also includes a heat exchanger, preferably a plenum heat exchanger, configured to direct the first type solid particles and the second type solid particles discharged from the reheater discharge in a downwardly flow to a heat exchanger discharge. The first type solid particles are directed such that heat from the first type solid particles is transferred to a working fluid in the heat exchanger. In a preferred implementation, the working fluid flows perpendicular to the downwardly flowing first type solid particles.

DETAILED DESCRIPTION OF A PREFERRED EMBODIMENT

Figure 1:
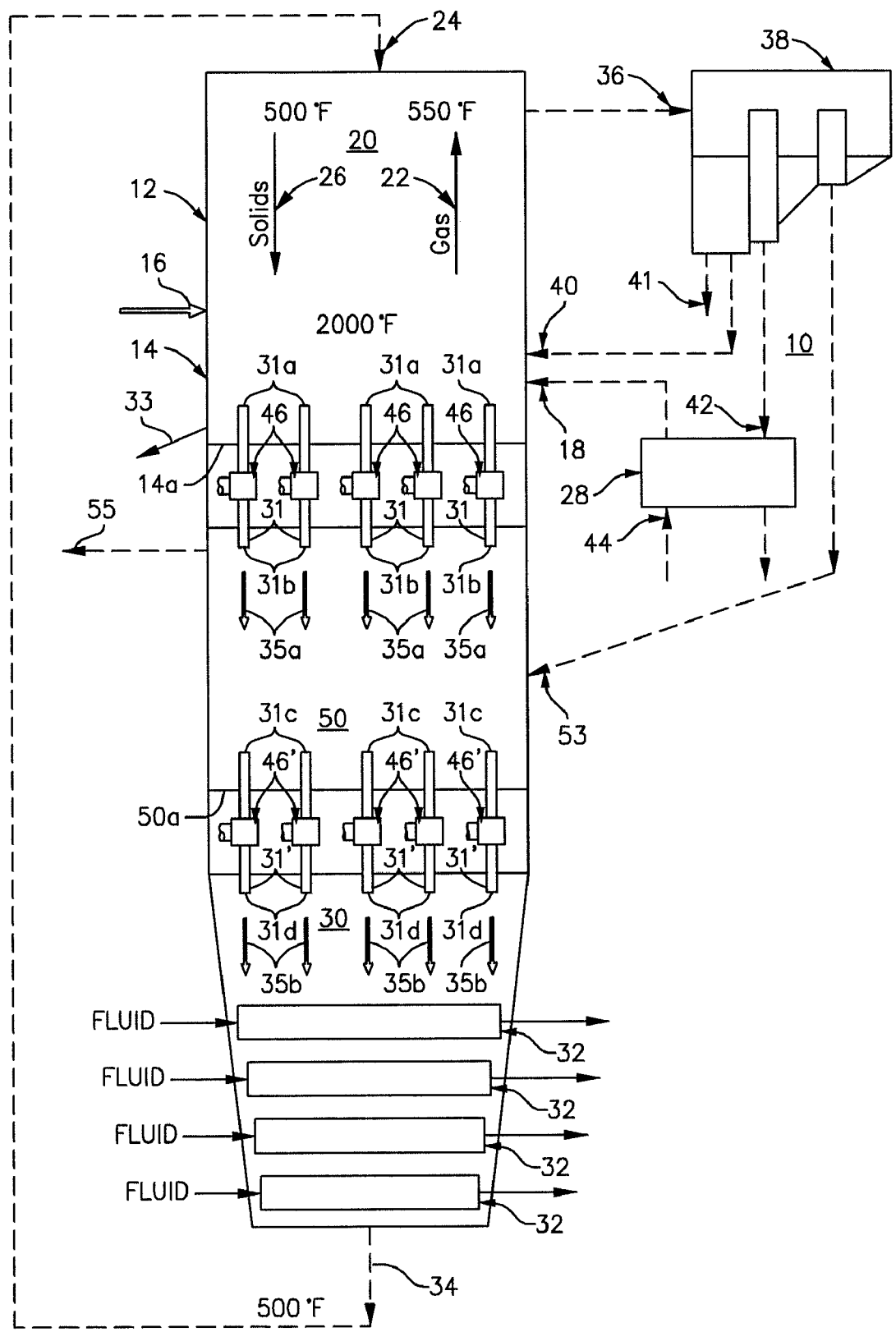
FIG. 1 is a diagrammatic illustration of a heat transfer system constructed in accordance with the present invention with the present invention, depicted with an internally generated heat source being employed in connection therewith.

FIG. 1 depicts a heat transfer system, generally designated by the reference numeral 10, having an internally generated heat source. The heat transfer system 10 includes a first portion, i.e., a vessel 20 which is composed of two zones, i.e., a lower zone 14 and an upper zone 12. In the system 10 of FIG. 1, the lower zone 14 is operative as a combustion zone, i.e., as the zone in which the internally generated heat source is generated. For an internally generated heat source, fuel 16 and combustion air 18 are injected in the lower zone 14. The injected fuel 16 and combustion air 18 are combusted, preferably through the use of conventional bubbling bed technology, thereby producing hot gases 22, which typically include residual ash/sorbent particles, that undergo an upward flow. It will be understood that the system 10 could, if desired, be easily adapted by those of routine skill in the art to facilitate use of an externally generated heat source, in lieu of the depicted internally generated heat source.

The upper zone 12 of the vessel 20 operates as a reactor such that a relatively large residence time, on the order of 6 to 7 seconds, is provided whereby a recuperation can occur. In recuperation, heat from the gases 22 is transferred to a flow of solid particles that are injected, as depicted by the arrowhead 24, into the upper zone 12 of the vessel 20, and which undergo a downward flow, as depicted by the arrow 26. As such, the upper zone 12 essentially functions in the manner of a counter flow, direct contact heat exchanger. To this end, no transfer of heat to water/steam takes place in either the lower zone 14 or the upper zone 12. Accordingly, the walls of the vessel 20 are designed so as to permit them to be refractory lined. Moreover, the solid particles 24 are effective in recuperating the heat from the gases 22 down to a temperature that is sufficiently low so as to enable the use of a conventional air heater 28 in the heat transfer system 10.

The solid particles 24 include a first type of particles and a second type of particles. Preferably, the first type solid particles are designed so as to have a high density as well as a high thermal conductivity. The higher the density thereof and the greater the number of the first type solid particles, i.e., the higher the surface area of the first type solid particles, the smaller the vessel 20 can be. To this end, it has been found that a variety of the forms of bauxite, e.g., $Al_2O_3$, are suitable for use as the first type solid particles. However, it is to be understood that there are other types of particles, embodying the characteristics mentioned above, that may also be employed in lieu of bauxite as the first type of solid particle.

The first type solid particles are also designed to have a much higher density and particle size than the residual solid fuel ash and sorbent particles. The first type solid particles are designed to fall downwards through the upper zone 12 even at the maximum gas velocities within the upper zone 12 of the vessel 20. That is, the terminal velocity of the first type solid particles within the upper zone 12 of the vessel 20 is greater than the maximum gas velocity within the upper zone 12 of the vessel 20. The cross-sectional area within the upper zone 20 of the vessel 12 is designed to ensure that the velocities of gas 22 as it flows up through the vessel 20 are high enough to entrain most of the residual solid fuel ash and sorbent particles and carry them upwards and out of the vessel 20 as denoted by the arrow designated by the reference numeral 36 in FIG. 1.

The first type solid particles are drained from the lower zone 14 in such a manner as to ensure that essentially no fines or coarse solid fuel ash or sorbent is also drained from the lower zone 14 into the second portion of the system 10, a carbonate reheater 50, also known as a calciner. A plurality of bed drain pipes, each of which is denoted in FIG. 1 by the same reference numeral 31, is located such that the inlet 31a of each one of the plurality of bed drain pipes 31 is located above the floor 14a of zone 14 of vessel 20. Through the use of this design, no large rocks, etc. are allowed to pass from the lower zone 14 to the reheater 50. Therefore, such large rocks, etc. are only removable from the vessel 20 by means of a separate bed drain disposal system 33.

In a manner to be more fully described with reference to FIG. 4, air is introduced into each of the plurality of bed drain pipes 31 in a sufficient amount to ensure that the velocity thereof is high enough to prevent the flow of residual solid fuel ash and sorbent particles down any of the drain pipes, while at the same time being insufficient to impede the downward flow of the first type particles through any of the drain pipes to the remainder of the heat transfer system 10.

In the recuperation occurring in the upper zone 12 of the vessel 20, carbon dioxide ($CO_2$) from the gases 22 is also transferred to the flow of the second type particles within the injected solids depicted by the arrowhead 24, as the second type particles initially undergo a downward flow, as depicted by the arrow 26, and later as they join the flow of the gases 36 exiting the vessel 20. As such, the upper zone 12 essentially functions in the manner of a counter flow, direct contact absorber. That is, the temperature in the upper zone 12 of the vessel 20 is maintained within the a temperature range of 1000 to 1400 degrees Fahrenheit, which is particularly favorable for facilitating the direct absorption of the $CO_2$ in the gases 22 by the second type particles.

Preferably, the second type solid particles are designed so as to have a high absorption capacity. Here again, the higher the absorption capacity and the greater the number of the second type particles, e.g., the higher the surface area of the second type solid particles, the smaller the vessel 20 can potentially be. To this end, it has been found that limestone particles, and preferably particles of calcium oxide (CaO), which are also sometimes referred to commonly as quicklime, are suitable for use as the second type solid particles. However, it is to be understood that other types of particles, embodying the characteristics mentioned above, may also be employed in lieu of limestone particles as the second type solid particle. Absorption of the $CO_2$ by the CaO particles produces $CaCO_3$, which is commonly referred to as recarbonated limestone, plus heat. Based on work performed to date, it appears that, using CaO particles, $CO_2$ removal rates of over 90% may be practical.

The second type solid particles are also designed to have a density and particle size no greater, and preferably lower, than the residual solid fuel ash and sorbent particles. The second type solid particles are designed such that, while at least some of these particles may initially fall downwards through the upper zone 12 even at the maximum gas velocities within the upper zone 12 of the vessel 20, all or substantially all of the second type solid particles ultimately mix and flow upwards with the gases 22. That is, the terminal velocity of the second type solid particles within the upper zone 12 of the vessel 20 is less than the maximum gas velocity within the upper zone 12 of the vessel 20. The cross-sectional area within the upper zone 20 of the vessel 12 is designed to ensure that the velocities of gas 22 as it flows up through the vessel 20 are high enough to entrain most if not all of the recarbonated second type solid particles, along with most of the residual solid fuel ash and sorbent particles, and carry all theses entrained particles upwards and out of the vessel 20 as denoted by the arrow designated by the reference numeral 36 in FIG. 1.

The residual solid fuel ash and sorbent particles and the recarbonated limestone particles, that are entrained with the gases 22, are ultimately discharged from the upper zone 12 of the vessel 20 as depicted by the arrow denoted by the reference numeral 36 in FIG. 1, to a low temperature, i.e., cold, cyclone 38 of conventional construction. Within the cold cyclone 38, in a manner well known to those skilled in the art, the solid fuel ash and the recarbonated limestone are separated from the gases 22.

After the separation, a portion of the separated solid fuel ash, as depicted by the arrow and dotted line generally designated by the reference numeral 40 in FIG. 1, is made to return to the lower zone 14 of the vessel 20 and the remainder of the separated solid fuel ash is discharged, as depicted by the arrow and dotted line generally designated by the reference numeral 41 in FIG. 1, from the cold cyclone 38 for eventual disposal. The separated recarbonated limestone, as depicted by the arrow and dotted line generally designated by the reference numeral 53 in FIG. 1, is made to flow to the carbonate reheater 50. On the other hand the residual gases 22, after having the solid fuel ash and recarbonated limestone separated therefrom in the cold cyclone 38, are discharged from the cold cyclone 38 to the air heater 28, as depicted by the arrow and dotted line generally designated by the reference numeral 42 in FIG. 1.

The solid fuel ash recycle as described above and which will be referred to herein as the "upper recycle loop" or "first recycle loop" primarily performs the following two functions: 1) it reduces the amount of unburned carbon that would otherwise be discharged from the vessel 20, and 2) it enables additional control to be had over the temperature that exists within the plenum heat exchanger 30. The recarbonated limestone recycle as described above and which will be referred to herein as the "second recycle loop" primarily performs the following function: it reduces the amount of carbon dioxide emissions that would otherwise be discharged from the cyclone 38.

Continuing, the heat transfer system 10 further includes a second portion, i.e., the carbonate reheater 50, to which reference has been previously made. Through the carbonate reheater 50 there is essentially a simple mass flow of the first type solid particles that have entered the reheater 50 after flowing through and having been discharged as schematically depicted by the arrowheads, each being denoted by the same reference numeral 35a, from the outlet, designated by the reference numeral 31b, of each of the plurality of bed drain pipes 31, such that once these first type solid particles have recuperated within the upper portion 12 of the vessel 20 the heat from the heat source, i.e., from the gases 22, these first type solid particles move downwardly, primarily under the influence of gravity, at a very low velocity, e.g., on the order of 40 m./hr. As such, in accordance with the best mode embodiment as the first type solid particles move downwardly, these particles take on the characteristics of a moving bed. However, it should be understood that these first type solid particles could also move downwardly in some other manner without departing from the essence of the present invention.

There is also essentially a simple mass flow through the carbonate reheater 50 of the second type solid particles, i.e. the recarbonated limestone particles, that have entered the reheater 50 after having been separated and discharged as schematically depicted by the arrowhead, each being denoted by the reference numeral 53, from the cold cyclone 38, such that the second type solid particles, having recuperated within the upper portion 12 of the vessel 20 the $CO_2$ from the gasses 22, and been separated in and discharged from the cyclone 38, move downwardly, primarily under the influence of gravity, at a very low velocity. As such, in accordance with the best mode embodiment as the second type solid particles, move downwardly, these particles also take on the characteristics of a moving bed. However, it should be understood that the second type solid particles could also move downwardly in some other manner without departing from the essence of the present invention. The important point here is that the heat transfer function from the hot first type solid particles, e.g. the heated bauxite particles, to the second type solid particles, e.g. the recarbonated limestone, will typically be performed in a non-counter flow fashion. However, it will be recognized that at least part of the overall system heat exchange function will typically be performed in a counter flow fashion.

In the course of moving downward, the downward moving mass flow of the first type solid particles and the downward moving mass flow of the second type solid particles intermixed causing a conductive heat exchange that is effected between the downward moving mass flow of the first type solid particles and the second type solid particles. The first type solid particles provide the sensible energy necessary for calcining the second type solid particles, i.e. recarbonated limestone, such as $CaCO_3$ at high partial pressures of $CO_2$. More particularly, in the calcining occurring in the carbonate reheater 50, carbon dioxide ($CO_2$) is transferred from the flow of the second type solid particles, e.g. from the recarbonated limestone discharged from the cyclone 38 as indicated by arrowhead 53, as the second type solid particles undergo a downward flow through the carbonate reheater 50. That is, the temperature in the carbonate reheater 50 is maintained within a temperature range of about 1800 to 2000 degrees Fahrenheit by the downward moving mass flow of the hot first type solid particles, e.g. the bauxite particles such as $Al_2O_3$, which is particularly favorable for facilitating the calcining of the $CO_2$ from the second type solid particles at the high partial pressures. The calcining performed in the reheater 50 results in a separation of the $CO_2$ gas from the second type solid particles, for example the CaO particles, which can now be regeneratively used. Sorbent degradation can be avoided by using a commercial sorbent activation process device by ALSTOM Power Inc. or by using dolomite. The calcining results in a nearly pure $CO_2$ gas which, as will be understood by those skilled in the art, will naturally separate from the first and second type solid particles in the reheater 50, and can be easily directed to a reheater discharge as indicated by the arrow 55. The nearly pure $CO_2$ is suitable for enhanced oil recovery or sequestration.

In accord with the best mode embodiment of the present invention the solid particles in the plenum heat exchanger 30 consist of bauxite, e.g., Al2O3, and quicklime, e.g., CaO, and include only a minimum amount of solid fuel ash. This is by virtue of the fact that a classification is effected within the vessel 20 between the first type solid particles of bauxite, i.e., Al2O3, and the solid fuel ash, and within the cyclone 38 between the second type solid particles of quicklime, i.e., CaO and the solid fuel ash. Namely, the solid fuel ash from the combustion of the solid fuel 16 and the combustion air 18 within the lower zone 14 of the vessel 20 are of micron size and of low density and thus become entrained in the upward flow of the gases 22. Similarly, the second type solid particles within the vessel 20 are of micron size and of low density, and thus also become entrained in the upward flow of the gases 22. On the other hand, the first type solid particles of bauxite, e.g., Al2O3, are very dense and 600 to 1200 microns in size and as such are too large to become entrained in the upward flow of the gases 22. In addition, the design of the plurality of bed drain pipes 31 coupled with the introduction of air thereinto, as has been mentioned above, provides additional classification and further ensures that only the first type solid particles of bauxite, e.g., Al2O3, are passed downward to the carbonate reheater 50, and restrict any passage upward of the recarbonated limestone, or of the quicklime and $CO_2$ which result from the recalcining, from the carbonate reheater 50 to the vessel 20. Thus, primarily under the influence of natural forces, including gravity, the first and second type solid particles of bauxite, e.g., Al2O3, recarbonated limestone, e.g. $CaCO_3$, and quicklime, e.g. CaO, move downwardly through the carbonate reheater 50 and the $CO_2$ moves upwardly through the carbonate reheater 50 to the discharge 55. Since the $CO_2$ is captured without the use of oxygen or tail end scrubbing, and at capture temperatures well above steam temperature, very little energy penalty results prior to the $CO_2$ compression.

The temperature of the carbonate reheater 50 is very important because it forms the basis for the conductive heat transfer between the downward moving mass of first type solid particles and the downward moving mass of second type solid particles, and thereby removal of $CO_2$ from the recarbonated limestone. In the heat transfer system 10 of the present invention, the temperature within the carbonate reheater 50 is a function of the Q fired, the excess air, the upper or first recycle rate, and the recarbonated limestone or second recycle rate. For a given Q fired, the independent variables become the first recycle rate and the second recycle rate. If it were to become necessary to increase the temperature of the first type and/or second type solid particles, the second recycle rate could be reduced, but the exit temperature of the gases 22 from the first portion 12 of the vessel 20 would increase due to the reduced surface area in which to recuperate the heat from the heat source, i.e., when an internally generated heat source is being employed in connection with the heat transfer system 10 of the present invention this heat source is the gases 22 produced from the combustion of the solid fuel 16 and combustion air 18 within the zone 14 of the vessel 20. The first recycle rate could be reduced to increase the temperature of the solid particles, but carbon loss would increase due to the fact that unburned carbon in the solid fuel ash would have fewer opportunities to be recycled from the cold cyclone 38 to the zone 14 of the vessel 20. Thus, the best strategy is considered to probably be some combination involving an adjustment of each of the two variables, i.e., some adjustment in the second recycle rate as well as some adjustment in the first recycle rate. Note is also taken herein of the fact that the upper limit of the temperature within the carbonate reheater 50 is driven by the ash fusion temperature of the solid fuel 16, which is nominally 2000 degrees F. To this end, for first type and the second type solid particles to remain free flowing within the carbonate reheater 50 the temperature within the carbonate reheater 50 must remain below the temperature where the solid fuel 16 and the combustion air 18 within the zone 14 of the vessel 20 is sticky.

The heat transfer system 10 further includes a third portion, i.e., the plenum heat exchanger 30. Suitably supported within the plenum heat exchanger 30 in mounted relation therewithin, as will be best understood with reference to FIG. 1, are one or more heat transfer surfaces. In accordance with the illustration in FIG. 1, four such heat transfer surfaces, each denoted by the same reference numeral 32, are schematically depicted in suitably supported mounted relation within the plenum heat exchanger 30. The heat transfer surfaces 32 can be mounted through the use of any conventional form of mounting means (not shown in the interest of maintaining clarity of illustration in the drawings) suitable for use for such a purpose, and are preferably to be suitably spaced from each other within the plenum heat exchanger 30, as desired for the particular implementation. It is to be understood, however, that a greater or lesser number of such heat transfer surfaces 32 could be employed in the plenum heat exchanger 30 without departing from the essence of the present invention.

Through the plenum heat exchanger 30 there is essentially a simple mass flow of the first type and the second type solid particles that have entered the plenum heat exchanger 30 after flowing through and having been discharged as schematically depicted by the arrowheads, each being denoted by the same reference numeral 35', from the outlet, designated by the reference numeral 31d, of each of the plurality of bed drain pipes 31', such that once these first type and second type solid particles have completed the calcining of the recarbonated limestone, e.g. $CaCO_3$, in the carbonate reheater 50, the first type and second type solid particles move downwardly, primarily under the influence of gravity, at a very low velocity. As such, these solid particles as they move downwardly take on the characteristics of a moving bed. Although in accordance with the best mode embodiment of the present invention, these solid particles as they move downwardly take on the characteristics of a moving bed, it is to be understood that these solid particles could also move downwardly in some other manner without departing from the essence of the present invention. The important point here is that the heat transfer function preferably be performed at least partially in a counter flow fashion. To this end, at least part of the heat exchange function must be performed in a counter flow fashion.

In the course of moving downward in the manner to which reference has been made above, this downward moving mass flow of first type and second type solid particles flows over the heat transfer surfaces 32, which in accord with the best mode embodiment of the present invention preferably each consists of a plurality of individual tubes (not shown in the interest of maintaining clarity of illustration in the drawings), which when taken collectively comprise a single one of the heat transfer surfaces 32. Through each of these tubes (not shown) of each of the heat transfer surfaces 32, there flows, as depicted schematically by the arrows that are each labeled with the word "FLUID", the "working fluid" of a cycle. As it is being used here, the term "working fluid" is intended to refer to the "working fluid" of a thermodynamic cycle such as, for example, steam or ammonia, as well as to a process feedstock. The conductive heat exchange that is effected between the downward moving mass flow of first and second type solid particles and the working fluid that flows through the tubes (not shown) that taken collectively comprise one of the heat exchanger surfaces 32, is preferably as has been discussed above one hundred percent counter flow. Although as has also been discussed above, such conductive heat exchange between the downward moving mass flow of first type and second type solid particles and the working fluid that flows through the tubes (not shown) may alternatively, at a minimum, be at least partially counter flow.

There exists no necessity to change the spacing between the individual tubes (not shown) that collectively comprise each of the heat transfer surfaces 32, when the fuel employed, which is subjected to combustion, for purposes of generating the heat source, changes. Further, since there is no flow of gases over the individual tubes (not shown) that collectively comprise each of the heat transfer surfaces 32, there is accordingly no gas side velocity constraints that in gas-to-tube heat exchangers creates the need for multiple sections of superheater, reheater, evaporator and economizer heat transfer surfaces, which most commonly are required in the case of prior art forms of circulating fluidized bed systems as well as in prior art forms of pulverized coal fired steam generators. As such, it is considered to be possible to provide a single circuit from the economizer inlet thereof to the superheater outlet thereof with the concomitant effect therefrom that header pressure losses are largely eliminated.

In accord with the best mode embodiment of the present invention the first type solid particles in the plenum heat exchanger 30 consist of virtually one hundred percent bauxite, i.e., $Al2O3$, and the second type solid particles in the plenum heat exchanger 30 consist of virtually one hundred percent quicklime, i.e., CaO, and each includes only a minimum amount of solid fuel ash. This is by virtue of the fact that a classification is effected within the vessel 20 between the first type solid particles of bauxite, i.e., $Al2O3$, and the solid fuel ash and second type solid particles, and effected in the cyclone 38 between the second type solid particles of recarbonated limestone, i.e., $CaCO_3$, and the solid fuel ash, and effected within the carbonate reheater 50 between the first type solid particles and second type solid particles of quicklime, i.e., $CaO_3$, and the carbon dioxide, i.e., $CO_2$. In this regard, the solid fuel ash from the heat source, e.g. the heat source from combustion of solid fuel 16 and combustion air 18 within the zone 14 of the vessel 12, and the second type solid particles of recarbonated limestone, i.e., $CaCO_3$, are of micron size and of low density and thus become entrained in the upward flow of the gases 22 in the vessel 20. On the other hand, the first type solid particles of bauxite, i.e., $Al2O3$, are very dense and 600 to 1200 microns in size and as such are too large to become entrained in the upward flow of the gases 22. Furthermore, while the solid fuel ash from the heat source and the second type solid particles of recarbonated limestone, i.e., $CaCO_3$, are both of micron size and of low density and thus become entrained in the upward flow of the gases 22 in the vessel 20, the second type solid particles of recarbonated limestone, i.e., $CaCO_3$, are designed to have a different density, and as such can be separated from the solid fuel ash in cyclone 38. In addition, the design of the plurality of bed drain pipes 31 and 31' coupled with the introduction of air thereinto, as has been mentioned hereinabove and to which further reference will be had hereinafter in connection with the discussion of FIGS. 5 and 6 of the drawings, provides additional classification and further ensures that (a) the first type solid particles of bauxite, i.e., $Al2O3$, but not more than a minimum amount of solid fuel ash or recarbonated limestone, are passed downward from the vessel 20 to the carbonate reheater 50, and that virtually none of the carbon dioxide, i.e., $CO_2$, is passed upward from the carbonate reheater 50 to the vessel 20 and (b) the first type solid particles of bauxite, i.e., $Al2O3$, and the second type particles of quicklime, i.e. CaO, but not the more than a minimum amount of solid fuel ash and virtually none of the carbon dioxide, i.e., $CO_2$, are passed downward from the carbonate reheater 50 to the to the plenum heat exchanger 30. Thus, primarily under the influence of gravity the first and second solid particles move downwardly as has been described hereinabove previously.

When the first type and second type solid particles reach the bottom of the plenum heat exchanger 30, the solid particles are cool enough, i.e., are at a temperature of approximately 500 degrees F. such that the solid particles 24, as indicated schematically by the dotted line generally designated by the reference numeral 34 can be transported back to the top of the vessel 20 for injection into the first portion 12 thereof, as has been described hereinabove previously in order to once again repeat the process of the solid particles 24 flowing through the vessel 20 and thereafter through the carbonate reheater 50 and the plenum heat exchanger 30. This flow of the solid particles within the heat transfer system 10 of the present invention will be referred to herein as the "third recycle loop" or "lower recycle loop".

The temperature of the plenum heat exchanger 30 is also very important because it forms the basis for the conductive heat transfer between the downward moving mass of first type and second type solid particles and the tubes (not shown) of the heat transfer surfaces 32 and thereby the working fluid that is flowing through these tubes (not shown). In the heat transfer system 10 of the present invention, the temperature within the plenum heat exchanger 30 is a function of the Q fired, the excess air, the upper or first recycle rate, the recarbonated limestone or second recycle rate, and the lower or third recycle rate. For a given Q fired, the independent variables become the first recycle rate, the second recycle rate and the third recycle rate. If it were to become necessary to increase the temperature of the first type and/or second type solid particles, the second and/or third recycle rates could be reduced, but the exit temperature of the gases 22 from the first portion 20 of the vessel 12 would increase due to the reduced surface area in which to recuperate the heat from the heat source. The first recycle rate could be reduced to increase the temperature of the solid particles, but carbon loss would increase due to the fact that unburned carbon in the solid fuel ash would have fewer opportunities to be recycled from the cold cyclone 38 to the zone 14 of the vessel 12. Thus, the best strategy is considered to probably be some combination involving an adjustment of each of the three variables, i.e., some adjustment in the lower or third recycle rate as well as some adjustment in the upper or first recycle rate and to the recarbonated limestone or second recycle rate. Here again, it should be noted that the upper limit of the temperature within the plenum heat exchanger 30 is driven by the ash fusion temperature of the solid fuel 16, which is nominally 2000 degrees F. To this end, for the first type and second type solid particles to remain free flowing within the plenum heat exchanger 30 the temperature within the plenum heat exchanger 30 must remain below the temperature where the solid fuel 16 and the combustion air 18 within the zone 14 of the vessel 12 is sticky.

Collecting in the mass of free flowing solid particles through recuperation the heat from the heat source, whether generated internally or externally, renders many things possible that are not possible either in prior art forms of circulating fluidized bed systems or in prior art forms of pulverized coal fired steam generators. By way of exemplification and not limitation in this regard, reference is made herein to the following, which are all deemed to be possible with a heat transfer system constructed in accordance with the present invention, such as the heat transfer system 10: 1) counter flow is possible in all circuits of the heat transfer system 10 constructed in accordance with the present invention; 2) there is no need to replace the tubes (not shown) of the heat transfer surfaces 32 as the temperature drops through the heat transfer system 10 of the present invention; 3) there is no corrosion, erosion or pluggage potential of the tubes (not shown) of the heat transfer surfaces 32 regardless of how bad the solid fuel 16 is; 4) all tubes (not shown) of the heat transfer surfaces 32 can be finned regardless of the properties of the solid fuel 16; 5) all of the tubes (not shown) of the heat transfer surfaces 32 are heated uniformly about the axis of each such individual tube (not shown) by conduction thereby eliminating single side heating of the tubes (not shown) as occurs, for example, with a waterwall form of construction; and 6) greatly enhanced heat transfer due to the fact that the rate of conduction is known to be much greater solids-to-tube than convective heat transfer in gas-to-tube heat transfer.

Additionally, collecting in the mass of free flowing solid particles through recuperation the carbon dioxide from the heat source, whether generated internally or externally, renders many other things possible that are not possible either in prior art forms of circulating fluidized bed systems or in prior art forms of pulverized coal fired steam generators. By way of exemplification and not limitation in this regard, reference is made herein to the following, which are all deemed to be possible with a heat transfer system constructed in accordance with the present invention, such as the heat transfer system 10: 1) capturing $CO_2$ without the use of oxygen, 2) capturing $CO_2$ without the use of tail end scrubbing, 3) capturing $CO_2$ at capture temperatures well above steam temperature, and 4) capturing $CO_2$ very little energy penalty prior to the $CO_2$ compression.

To complete the description of the heat transfer system 10 of the present invention as illustrated in FIG. 1, note is made here of the fact that the combustion air 18, which is injected into the zone 14 of the vessel 12, before being so injected thereinto is preferably first heated within the air heater 28 by virtue of a heat exchange between the gases, which as denoted by the reference numeral 42 are made to flow through the air heater 28, and the air, which as depicted by the arrow denoted by the reference numeral 44, for this purpose is made to enter and flow through the air heater 28. It is also deemed to be very important to note here that essentially the only air that is employed with the heat transfer system 10 of the present invention in accordance with the best mode embodiment thereof is the combustion air 18 that is injected into the zone 14 of the vessel 12. Moreover, note is also made here that such combustion air 18 is only employed when the heat source that is being utilized is an internally generated heat source. Further to this point, it is deemed to be very important to recognize that no air and/or any gas is injected into the carbonate reheater 50 or the plenum heat exchanger 30 for purposes of effecting therewith a fluidization within the carbonate reheater 50 or the plenum heat exchanger 30 of the downward moving mass of first type and second type solid particles therewithin. The only other air that is employed with the heat transfer system 10 of the present invention is that which is introduced into each of the plurality of bed drain pipes 31 and 31'. In the case of bed drain pipes 31 the air is employed for purposes of effecting additional classification therewithin between the first type solid particles and both the second type solid particles and any fines, solid fuel ash and/or sorbent particles that might otherwise enter any one or more of the plurality of bed drain pipes 31 and for the purposes of preventing a flow, which might otherwise occur, of the $CO_2$ separated in the carbonate reheater 50 to the vessel 20. In the case of bed drain pipes 31' the air is employed for purposes of effecting additional classification therewithin between both the first type and second solid particles and any fines, solid fuel ash and/or sorbent particles that might otherwise enter any one or more of the plurality of bed drain pipes 31', and for the purposes of preventing any leakage, which might otherwise occur, of the $CO_2$ separated in the carbonate reheater 50 to the plenum heat exchanger 30.

Figure 2:
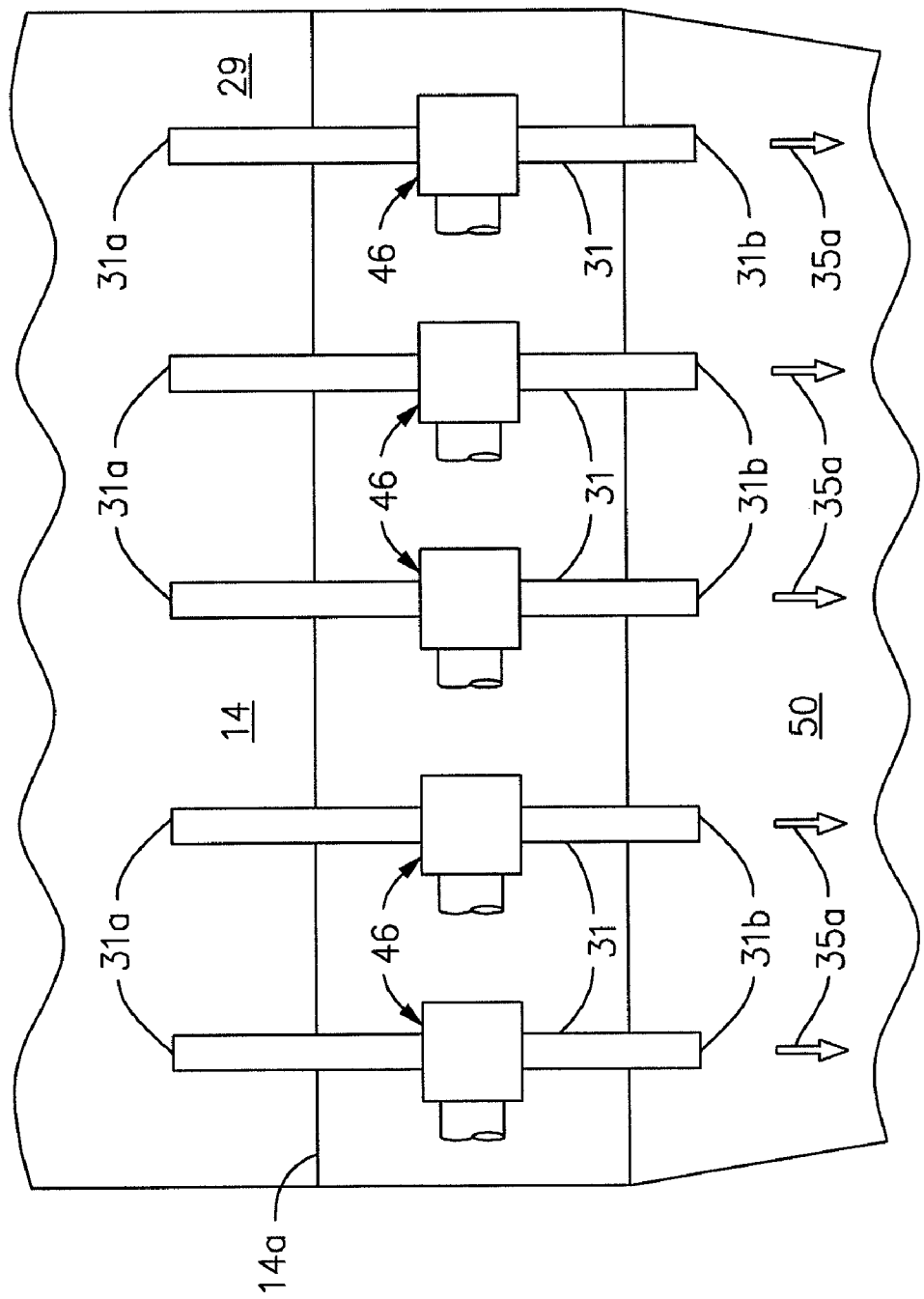
FIG. 2 is a side elevation view on an enlarged scale of the mechanical interconnection, in accordance with the best mode embodiment of the present invention, between the first and second portions of the heat transfer system of the present invention as illustrated in FIG. 1, which is traversed by the hot solids in going from the first portion to the second portion in accordance with the mode of operation of the heat transfer system of the present invention.

A brief reference will next be-had herein to FIG. 2 of the drawings. To this end, there is depicted in FIG. 2 a side elevational view on an enlarged scale of the mechanical interconnection, in accordance with the best mode embodiment of the invention, between the first portion, i.e., the vessel 20, of the heat transfer system 10 and the second portion, i.e., the carbonate reheater 50, thereof, which is traversed by the hot first type solid particles in going from the vessel 20 to the carbonate reheater 50 in accordance with the mode of operation of the heat transfer system 10. More specifically, as best understood with reference to FIG. 2 of the drawings, a mechanical interconnection is effected between the zone 14 of the vessel 20 and the carbonate reheater 50 such that there exists a space therebetween, denoted generally in FIG. 2 by the reference numeral 29. Namely, the perimeter encircling the space 29 is closed through the use of any conventional form of means suitable for use for the purpose of effecting therewith the mechanical interconnection of the floor 14a of the zone 14 of the vessel 20 with the carbonate reheater 50 such that the vessel 20 and the carbonate reheater 50 are supported in spaced relation one to another and with the confined space 29 extending therebetween. As has been described hereinbefore in connection with the description of the heat transfer system 10, a plurality of bed drain pipes 31 span the confined space 29 such as to comprise the sole means of communication between the zone 14 of the vessel 20 and the carbonate reheater 50. To this end, as best understood with reference to FIG. 2 of the drawings, the plurality of bed drain pipes 31, as shown, project upwardly through the floor 14a of the zone 14 of the vessel 20 such that the inlet 31a of each of the plurality of bed drain pipes 31 is located in spaced relation to the floor 14a of the zone 14 of the vessel 20. Similarly, the outlet 31b of each of the plurality of bed drain pipes 31, as shown, project inwardly into the carbonate reheater 50 such that the outlet 31b of each of the plurality of bed drain pipes 31 extends into the carbonate reheater 50 to a suitable extent from the confined space 29.

Figure 4:
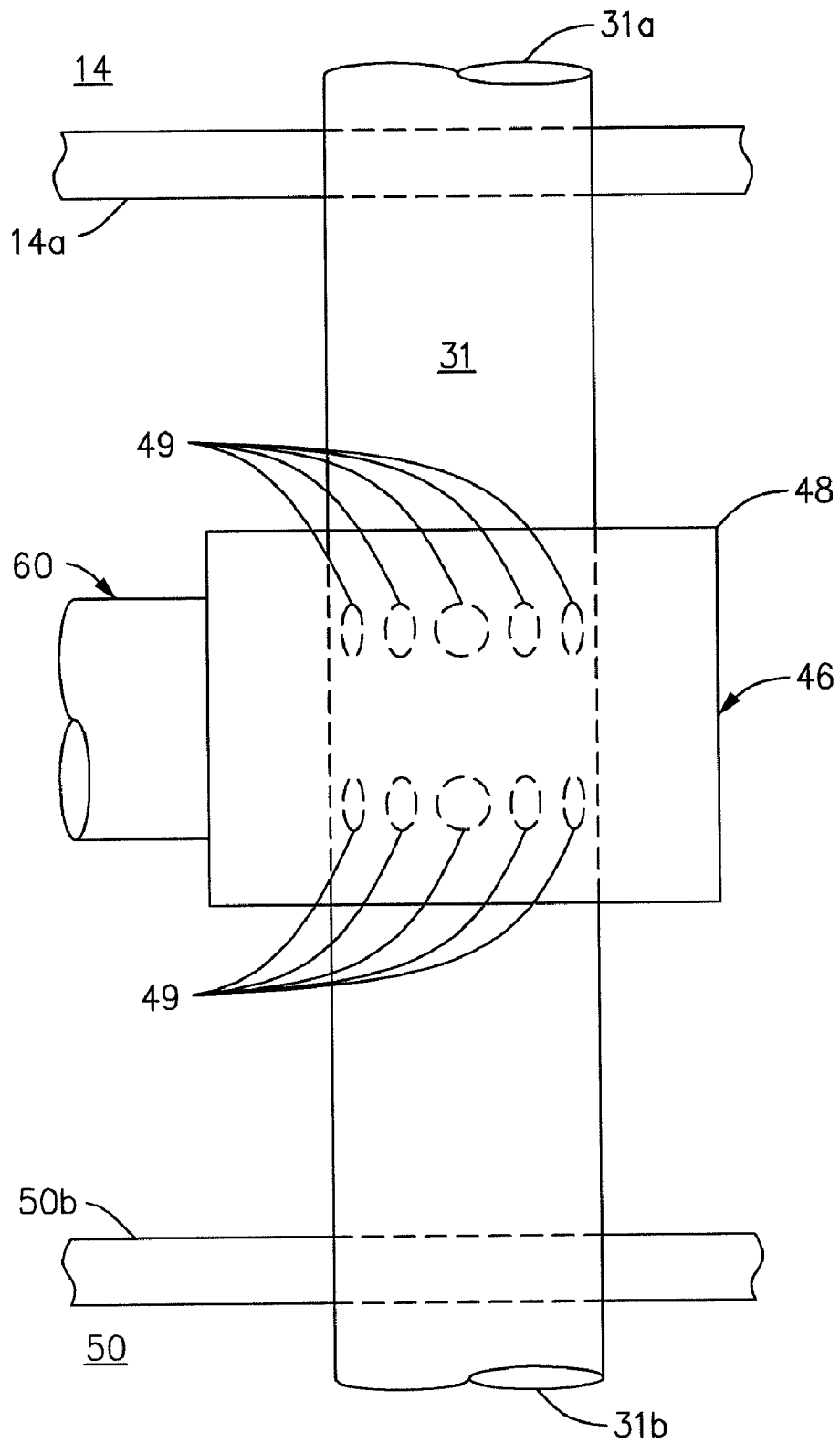
FIG. 4 is a side elevation view on an enlarged scale of the section of the heat transfer system of the present invention whereat the classification process is performed whereby the heat transfer solids, e.g., bauxite, are separated from solid fuel ash, sorbent, combustibles and flue gas.

Consideration will next be had herein to FIG. 4 of the drawings wherein there is depicted on an enlarged scale the section of the heat transfer system 10, whereat the classification process is performed whereby the hot first type solid particles, e.g., hot bauxite particles, are separated from the second type solid particles, e.g. the recarbonated limestone, the solid fuel ash, sorbent, combustibles and the flue gas. To this end, there is illustrated in FIG. 4 of the drawings a portion of the floor 14a of the zone 14 of the vessel 20, and a portion of the upper, as viewed with reference to FIG. 4, surface, generally designated by the reference numeral 50b, of the carbonate reheater 50. In addition, depicted in FIG. 4 by way of exemplification is a single one of the plurality of bed drain pipes 31, having its inlet 31a a located within the zone 14 of the vessel and in suitably spaced relation to the floor 14a, and its outlet 31b located within the carbonate reheater 50 and in suitably spaced relation to the upper surface 50b of the carbonate reheater 50.

Referring again to FIG. 4 of the drawings, as shown therein there is mounted, in accordance with the best mode embodiment of the present invention, in surrounding relation to the bed drain pipe 31, so as to be suitably spaced from both the floor 14a of the zone 14 of the vessel 20 and the upper surface 50b of the carbonate reheater 50 is a classification means, generally denoted by the reference numeral 46. Any conventional form of mounting means (not shown in the interest of maintaining clarity of illustration in the drawings) suitable for effecting the mounting of the classification means 46 in surrounding relation to the bed drain pipe 31 may be utilized for this purpose. As will be best understood with reference to FIG. 1 of the drawings, in accordance with the best mode embodiment of the present invention a classification means 46 preferably is cooperatively associated with each one of the plurality of bed drain pipes 31 such that the number of individual classification means 46 corresponds to the number of individual bed drain pipes 31 that are employed in the heat transfer system 10.

Continuing, as best understood with reference to FIG. 4 of the drawings, the classification means 46 comprises an essentially circular member, denoted by the reference numeral 48, to which a tubular-like member, denoted by the reference numeral 60, is suitably affixed at one end thereof, through the use of any form of conventional means suitable for such purpose, with the other end of the tubular-like member 60 being connected to a suitable source of air (not shown) such that air is permitted to flow through a suitable manifold-like means (not shown in the interest of maintaining clarity of illustration in the drawings) into and through the tubular-like member 60 to the circular member 48 and therefrom in surrounding relation to the bed drain pipe 31 whereupon such air is made to enter the bed drain pipe 31 through a plurality of openings, which are depicted through the use of phantom lines in FIG. 4 and which are each denoted for ease of reference thereto by the same reference numeral 49, that are provided for this purpose in suitably spaced relation one to another around the circumference of the bed drain pipe 31. A greater or a lesser number of openings 49 from that depicted in phantom lines in FIG. 4 could be employed without departing from the essence of the present invention.

The air after entering the bed drain pipe 31 through the openings provided around the circumference of the bed drain pipe 31 for this purpose flows upwardly through the bed drain pipe 31 into the zone 14 of the vessel 20. The amount of air that is introduced in the aforesaid manner into the bed drain pipe 31 is designed to be such that the velocity of this air is high enough to prevent a flow of undesired matter, such as the second type solid particles, e.g. the recarbonated limestone, as well as fines, solid fuel ash and sorbent particles, from flowing downwardly from the zone 14 of the vessel 12 through the bed drain pipe 31 into the carbonate reheater 50, while at the same time the velocity of this air flow is not sufficient enough to impede the downward flow of the first type solid particles from the zone 14 of the vessel 20 through the bed drain pipe 31 into the carbonate reheater 50.

The air after entering the bed drain pipe 31 through the openings provided around the circumference of the bed drain pipe 31 for this purpose also flows downward through the bed drain pipe 31 into the carbonate reheater 50. The amount of air that is introduced in the aforesaid manner into the bed drain pipe 31 is also designed to be such that the velocity of this air is high enough to prevent a flow of undesired matter, such as $CO_2$ from flowing upwardly from the carbonate reheater 50 through the bed drain pipe 31 into the zone 14 of the vessel 12, while at the same time the velocity of this air flow is not sufficient enough to unacceptably increase the downward flow of the first type solid particles from the zone 14 of the vessel 20 through the bed drain pipe 31 into the carbonate reheater 50.

Figure 3:
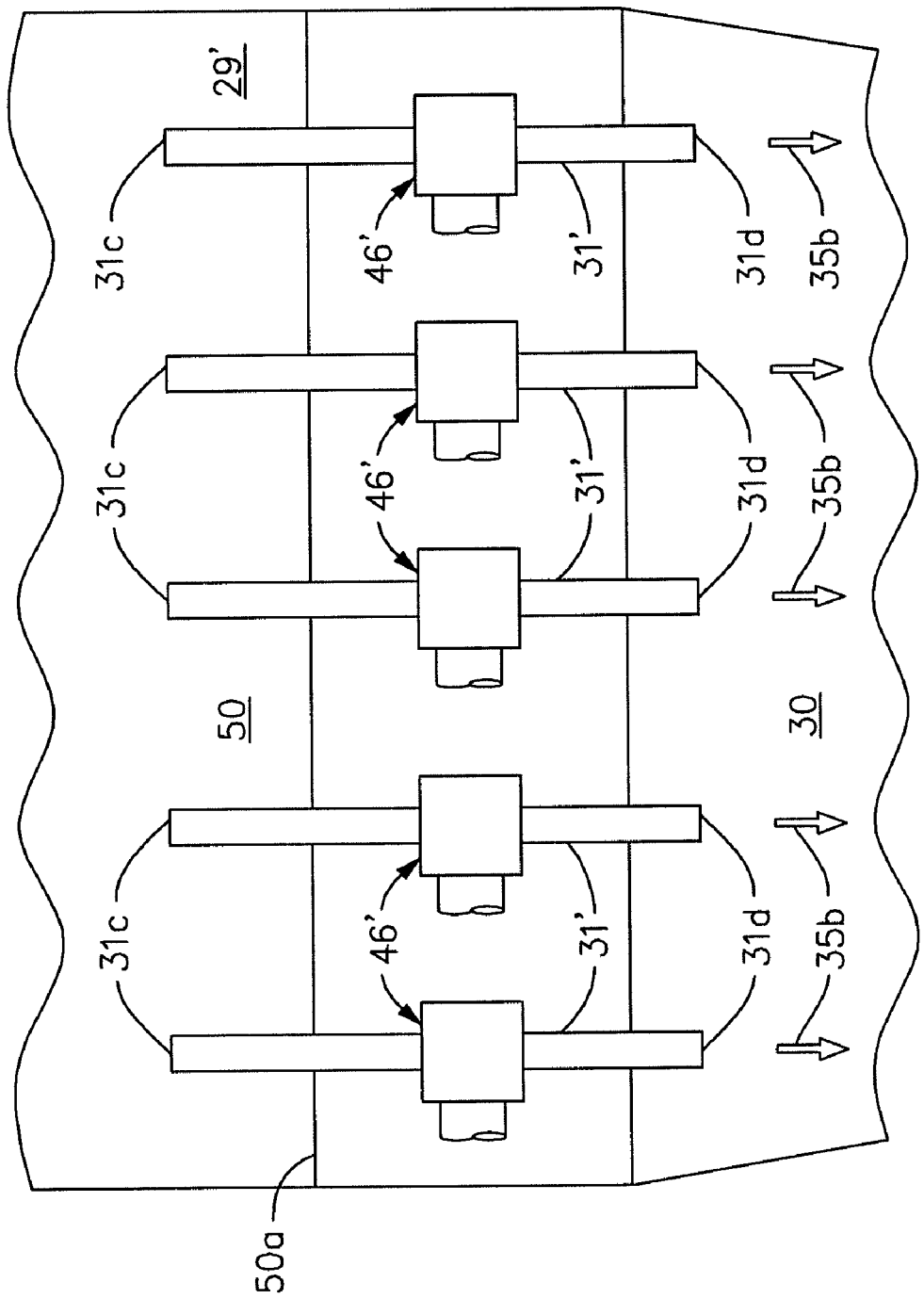
FIG. 3 is a side elevation view on an enlarged scale of the mechanical interconnection, in accordance with the best mode embodiment of the present invention, between the second and third portions of the heat transfer system of the present invention as illustrated in FIG. 1, which is traversed by the hot solids in going from the second portion to the third portion in accordance with the mode of operation of the heat transfer system of the present invention.

A brief reference will next be-had herein to FIG. 3 of the drawings. To this end, there is depicted in FIG. 3 a side elevational view on an enlarged scale of the mechanical interconnection, in accordance with the best mode embodiment of the invention, between the second portion, i.e., the carbonate reheater 50, of the heat transfer system 10 and the third portion, i.e., the plenum heat exchanger 30, thereof, which is traversed by both the hot first type solid particles and the calcinated second type solid particles in going from the carbonate reheater 50 to the plenum heat exchanger 30 in accordance with the mode of operation of the heat transfer system 10. More specifically, as best understood with reference to FIG. 3 of the drawings, a mechanical interconnection is effected between the carbonate reheater 50 and the plenum heat exchanger 30 such that there exists a space therebetween, denoted generally in FIG. 3 by the reference numeral 29'. Namely, the perimeter encircling the space 29' is closed through the use of any conventional form of means suitable for use for the purpose of effecting therewith the mechanical interconnection of the floor 50a of the carbonate reheater 50 with the plenum heat exchanger 30 such that the carbonate reheater 50 and the plenum heat exchanger 30 are supported in spaced relation one to another and with the confined space 29' extending therebetween. As has been described hereinbefore in connection with the description of the heat transfer system 10, a plurality of bed drain pipes 31' span the confined space 29' such as to comprise the sole means of communication between the carbonate reheater 50 and the plenum heat exchanger 30. To this end, as best understood with reference to FIG. 3 of the drawings, the plurality of bed drain pipes 31', as shown, project upwardly through the floor 50a of the carbonate reheater 50 such that the inlet 31c of each of the plurality of bed drain pipes 31' is located in spaced relation to the floor 50a of the carbonate reheater 50. Similarly, the outlet 31d of each of the plurality of bed drain pipes 31', as shown, project inwardly into the plenum heat exchanger 30 such that the outlet 31d of each of the plurality of bed drain pipes 31' extends into the plenum heat exchanger 30 to a suitable extent from the confined space 29'.

Figure 5:
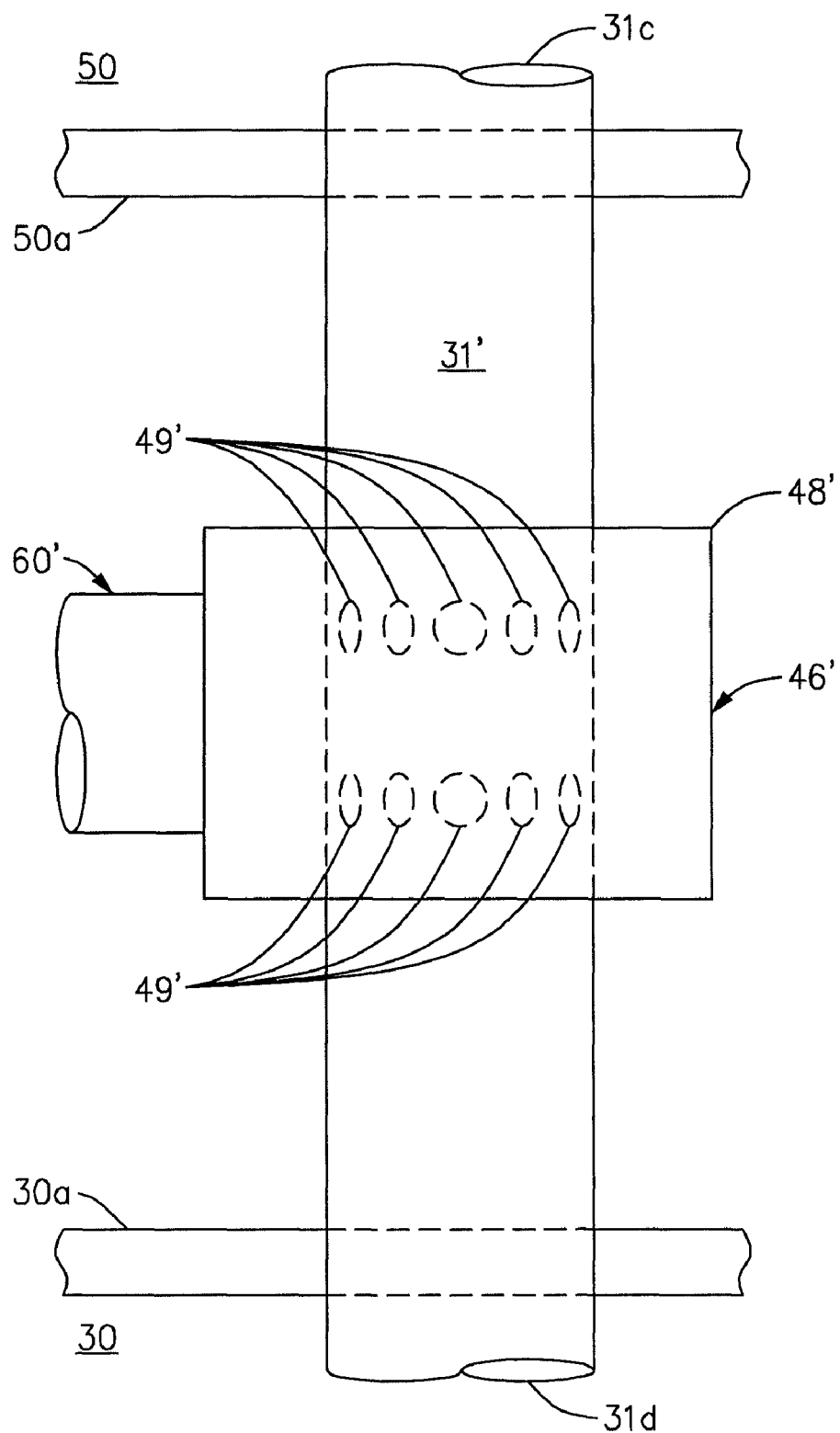
FIG. 5 is a side elevation view on an enlarged scale of the section of the heat transfer system of the present invention whereat the classification process is performed whereby the certain solids, e.g., bauxite and limestone, are separated from carbon dioxide gas.

Consideration will next be had herein to FIG. 5 of the drawings wherein there is depicted on an enlarged scale the section of the heat transfer system 10, whereat the classification process is performed whereby both the hot first type solid particles, e.g., hot bauxite particles, and the second type solid particles, e.g. the calcinated limestone, are separated from the carbon dioxide and any solid fuel ash, sorbent, combustibles. To this end, there is illustrated in FIG. 5 of the drawings a portion of the floor 50a of the carbonate reheater 50, and a portion of the upper, as viewed with reference to FIG. 5, surface, generally designated by the reference numeral 30a, of the plenum heat exchanger 30. In addition, depicted in FIG. 5 by way of exemplification is a single one of the plurality of bed drain pipes 31', having its inlet 31c located within the carbonate reheater 50 and in suitably spaced relation to the floor 50a, and its outlet 31d located within the plenum heat exchanger 30 and in suitably spaced relation to the upper surface 30a of the plenum heat exchanger.

Referring again to FIG. 5 of the drawings, as shown therein there is mounted, in accordance with the best mode embodiment of the present invention, in surrounding relation to the bed drain pipe 31', so as to be suitably spaced from both the floor 50a of the carbonate reheater 50 and the upper surface 30a of the plenum heat exchanger 30 is a classification means, generally denoted by the reference numeral 46'. Any conventional form of mounting means (not shown in the interest of maintaining clarity of illustration in the drawings) suitable for effecting the mounting of the classification means 46' in surrounding relation to the bed drain pipe 31' may be utilized for this purpose. As will be best understood with reference to FIG. 1 of the drawings, in accordance with the best mode embodiment of the present invention a classification means 46' preferably is cooperatively associated with each one of the plurality of bed drain pipes 31' such that the number of individual classification means 46' corresponds to the number of individual bed drain pipes 31' that are employed in the heat transfer system 10.

Continuing, as best understood with reference to FIG. 5 of the drawings, the classification means 46' comprises an essentially circular member, denoted by the reference numeral 48', to which a tubular-like member, denoted by the reference numeral 60', is suitably affixed at one end thereof, through the use of any form of conventional means suitable for such purpose, with the other end of the tubular-like member 60' being connected to a suitable source of air (not shown) such that air is permitted to flow through a suitable manifold-like means (not shown in the interest of maintaining clarity of illustration in the drawings) into and through the tubular-like member 60' to the circular member 48' and therefrom in surrounding relation to the bed drain pipe 31' whereupon such air is made to enter the bed drain pipe 31' through a plurality of openings, which are depicted through the use of phantom lines in FIG. 5 and which are each denoted for ease of reference thereto by the same reference numeral 49', that are provided for this purpose in suitably spaced relation one to another around the circumference of the bed drain pipe 31. A greater or a lesser number of openings 49' from that depicted in phantom lines in FIG. 5 could be employed without departing from the essence of the present invention.

The air after entering the bed drain pipe 31' through the openings provided around the circumference of the bed drain pipe 31' for this purpose flows upwardly through the bed drain pipe 31' into the carbonate reheater 50. The amount of air that is introduced in the aforesaid manner into the bed drain pipe 31' is designed to be such that the velocity of this air is high enough to prevent a flow of undesired matter, such as $CO_2$, as well as any fines, solid fuel ash and sorbent particles, from flowing downwardly from the carbonate reheater 50 through the bed drain pipe 31' into the plenum heat exchanger 30, while at the same time the velocity of this air flow is not sufficient enough to impede the downward flow of the first type and second type solid particles from the carbonate reheater 50 through the bed drain pipe 31' into the plenum heat exchanger 30.

Thus, in accordance with the present invention there has been provided a new and improved design for a heat transfer system that is predicated upon the employment therefore of a new and novel approach insofar as heat transfer systems are concerned. In addition, there has been provided in accord with the present invention such a new and improved technique that is characterized by reduced carbon dioxide $CO_2$ emissions from the burning of fossil fuels. Furthermore, there has been provided in accord with the present invention such a new and improved technique that is also characterized by reduced $CO_2$ emissions from the burning of fossil at less expense and with greater efficiency. Additionally, there has been provided in accord with the present invention such a new and improved technique that is also characterized by a recuperative and conductive heat transfer system with reduced $CO_2$ emissions. There is additionally provided an improved technique characterized by the removal of carbon dioxide from gases and/or residual ash/sorbent particles produced as a consequence of combustion of fossil fuel in the presence of air in a combustor. Also, there has been provided in accord with the present invention such a new and improved technique that is also characterized by a recuperative and conductive heat transfer system capable of reducing carbon dioxide emissions from the burning of fossil fuel.

While an embodiment of our invention have been shown, it will be appreciated that modifications thereof, some of which have been alluded to hereinabove, may still be readily made thereto by those skilled in the art. We, therefore, intend by the appended claims to cover the modifications alluded to herein as well as all the other modifications that fall within the true spirit and scope of our invention.

We claim:

1. A system for reducing carbon dioxide emissions from gasses generated in burning fossil fuel, comprising:
    a vessel configured (i) to direct gasses generated in burning fossil fuel, in an upwardly flow at a velocity from a lower portion of the vessel to an upper portion of the vessel, (ii) to receive, into the upper portion of the vessel, first type solid particles capable of absorbing heat from the gasses and second type solid particles capable of capturing carbon dioxide from the gasses, and (iii) to direct the received first type solid particles in a downwardly flow from the upper portion of the vessel to the lower portion of the vessel, wherein the velocity of the upwardly flow of gasses (i) is sufficient to cause the second type solid particles to flow with the upwardly flowing gasses to a first vessel discharge and (ii) is insufficient to impede the downwardly flow of the first type solid particles to a second vessel discharge;

a separator configured (i) to separate the second type solid particles with captured carbon dioxide from the gasses discharged from the first vessel discharge, and (ii) to direct the separated second type solid particles with the captured carbon dioxide to a separator discharge; and a reheater configured (i) to direct the first type solid particles with absorbed heat discharged from the second vessel discharge and the second type solid particles with the captured carbon dioxide discharged from the separator discharge in a downwardly flow to a first reheater discharge, such that heat from the first type solid particles causes the captured carbon dioxide to be released from the second type solid particles, and (ii) to direct the released carbon dioxide to a second reheater discharge.

2. The system of claim 1, wherein:
the first type solid particles include bauxite; and
the second type solid particles include limestone.

3. The system of claim 1, wherein:
the second type solid particles are CaO particles; and
the second type solid particles with the captured carbon dioxide are $CaCO_3$ particles.

4. The system of claim 1, wherein:
the flow of gasses within the vessel heats the upper portion of the vessel to a temperature within a range of 1000 to 1400 degrees Fahrenheit; and
the second type solid particles capture the carbon dioxide from the gasses at the temperature.

5. The system of claim 1, wherein:
the flow of the first type solid particles with the absorbed heat heats the reheater to a temperature within a range of 1800 to 2000 degrees Fahrenheit; and
the captured carbon dioxide is released from the second type solid particles at the temperature.

6. The system of claim 1, wherein:
the reheater is a calciner; and
the separator is a cyclone.

7. The system of claim 1, wherein the released carbon dioxide is substantially pure carbon dioxide.

8. The system of claim 1, wherein the downwardly flow of the received first type solid particles is a gravity based flow.

9. The system of claim 1, wherein the second vessel discharge includes an interconnection device having:
an upper opening configured to receive the downwardly flowing first type solid particles with the absorbed heat from the lower portion of the vessel;
a lower opening configured to discharge the downwardly flowing first type solid particles with the absorbed heat into the reheater;
a passageway having an aperture and configured (i) to receive a flow of air, having a velocity, through the aperture, (ii) to direct the received flow of air through the passageway, and (iii) to direct the first type solid particles with the absorbed heat in a downwardly flow from the upper opening to the lower opening, wherein the velocity of the received flow of air directed to the passageway is insufficient to impede the downwardly flow of the first type solid particles with the absorbed heat from traversing the passageway from the upper opening to the lower opening and is sufficient to impede the released carbon dioxide from traversing the passageway from the lower opening to the upper opening and thereby entering the vessel.

10. The system of claim 1, further comprising:
a heat exchanger configured (i) to direct the first type solid particles with the absorbed heat and the second type solid particles discharged from the second reheater discharge in a downwardly flow to a heat exchanger discharge, such that heat from the first type solid particles is transferred to a working fluid.

11. A method for reducing carbon dioxide emissions from gasses generated in burning fossil fuel, comprising:
directing gasses generated in burning fossil fuel, in an upwardly flow at a velocity;
directing first type solid particles in a downwardly flow such that heat from the upwardly flowing gasses is absorbed by the downwardly flowing first type solid particles, wherein the velocity of the upwardly flow of gasses is insufficient to impede the downwardly flow of the first type solid particles;
introducing second type solid particles into the upwardly flowing gasses, such that the introduced second type solid particles capture carbon dioxide from the upwardly flowing gasses;
separating the second type solid particles with the captured carbon dioxide from the gasses;
introducing the separated second type solid particles with the captured carbon dioxide to the downwardly flowing first type solid particles with the absorbed heat, such that heat from the first type solid particles causes the captured carbon dioxide to be released from the introduced second type solid particles;
directing the released carbon dioxide in an upwardly flow to a point of discharge.

12. The method of claim 11, wherein:
the first type solid particles include bauxite; and
the second type solid particles include limestone.

13. The method of claim 11, wherein:
the second type solid particles are CaO particles; and
the second type solid particles with the captured carbon dioxide are $CaCO_3$ particles.

14. The method of claim 11, wherein:
the upwardly flowing gasses produce a temperature within a range of 1000 to 1400 degrees Fahrenheit; and
the second type solid particles capture the carbon dioxide from the gasses at the temperature.

15. The method of claim 11, wherein:
the downwardly flowing heated first type solid particles with the absorbed heat produce a temperature within a range of 1800 to 2000 degrees Fahrenheit; and
the captured the carbon dioxide is released from the second type solid particles at the temperature.

16. The method of claim 11, wherein the released carbon dioxide is substantially pure carbon dioxide.

17. The method of claim 11, wherein the downwardly flow of the first type solid particles is a gravity based flow.

18. The method of claim 11, further comprising:
directing a flow of working fluid; and
after the release of the carbon dioxide, directing the downwardly flowing first type solid particles with the absorbed heat, such that heat from the downwardly flowing first type solid particles is transferred to a working fluid.

* * * * *